United States Patent
Chapman

(10) Patent No.: US 8,882,088 B2
(45) Date of Patent: Nov. 11, 2014

(54) CAMERA PLATFORM HORIZONTAL AXIS SHOCK AND VIBRATION ISOLATOR

(75) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 217 days.

(21) Appl. No.: 13/542,339

(22) Filed: Jul. 5, 2012

(65) Prior Publication Data

US 2014/0008850 A1    Jan. 9, 2014

(51) Int. Cl.
*G03B 17/56* (2006.01)

(52) U.S. Cl.
USPC ............ 267/140.11; 267/141; 396/421

(58) Field of Classification Search
CPC ..... B66F 11/048; F16F 15/021; F16F 15/022; F16M 11/125
USPC .......... 267/140.11, 141, 141.2; 248/567, 603, 248/581–583, 179.1, 184.1, 187.1; 352/243; 396/421
See application file for complete search history.

(56) References Cited

U.S. PATENT DOCUMENTS

| | | | |
|---|---|---|---|
| 4,989,823 A | 2/1991 | Chapman | |
| 5,312,121 A | 5/1994 | Chapman | |
| 5,816,552 A | 10/1998 | Chapman | |
| 6,086,207 A * | 7/2000 | Chapman | ............. 352/243 |
| 6,758,623 B2 * | 7/2004 | Bushey | ............. 403/57 |
| 7,137,747 B2 | 11/2006 | Chapman | |
| 7,775,488 B2 * | 8/2010 | McAnulty | ............. 248/188.7 |
| 2005/0232625 A1 | 10/2005 | Chapman | |
| 2006/0147195 A1 * | 7/2006 | Lim et al. | ............. 396/427 |
| 2006/0239678 A1 | 10/2006 | Itzkowitz | |
| 2010/0301164 A1 | 12/2010 | Hudson | |

FOREIGN PATENT DOCUMENTS

JP    2004-340372 A    12/2004
JP    2009180764 A1    8/2009

OTHER PUBLICATIONS

Chapman/Leonard Studio Equipment, Inc. 2005-2006 Catalog, pp. 22, 25, 38, 39, 42, 50, 57, 70, 74 and 75.
Chapman/Leonard Studio Equipment, Inc. 2008-2010 Catalog, pp. 68-70.
Rotating Offset, Pivot (ROP), www.jlfisher.com/dollies/optional_accessories . . . (Jun. 28, 2012).
Korean Intellectual Property Office, International Search Report and Written Opinion for PCT/US2013/047976, Sep. 26, 2013.

* cited by examiner

*Primary Examiner* — Anna Momper
(74) *Attorney, Agent, or Firm* — Kenneth H. Ohriner; Perkins Coie LLP

(57) ABSTRACT

A shock and vibration isolator camera includes a top plate is attached to a bottom plate via a universal joint that allows the top plate to pivot about two mutually perpendicular axes relative to the bottom plate. A camera attachment fitting, such a Mitchell mount fitting, may be provided on the top plate, for attaching a camera or camera accessory to the top plate. A threaded fitting may be provided on the bottom plate, for attaching the isolator to a supporting structure. A dampener/spring element is positioned between the top and bottom plates. The dampener/spring element may be separate springs and dampeners, such as gas or viscous dampeners. Alternatively, spring loaded shock absorbers, or a resilient material may be used.

8 Claims, 4 Drawing Sheets

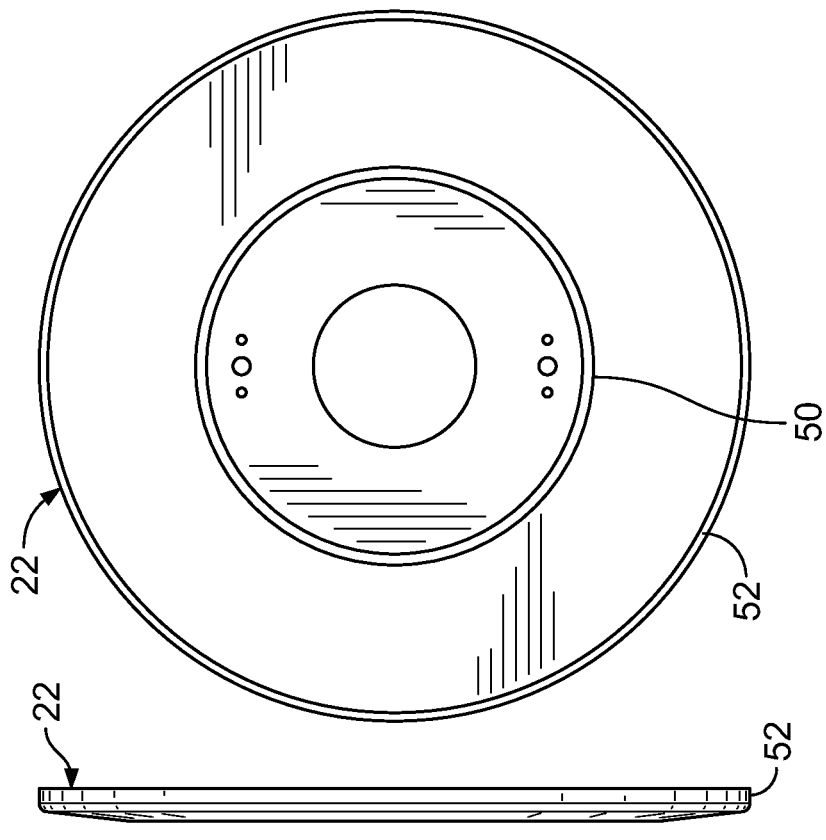
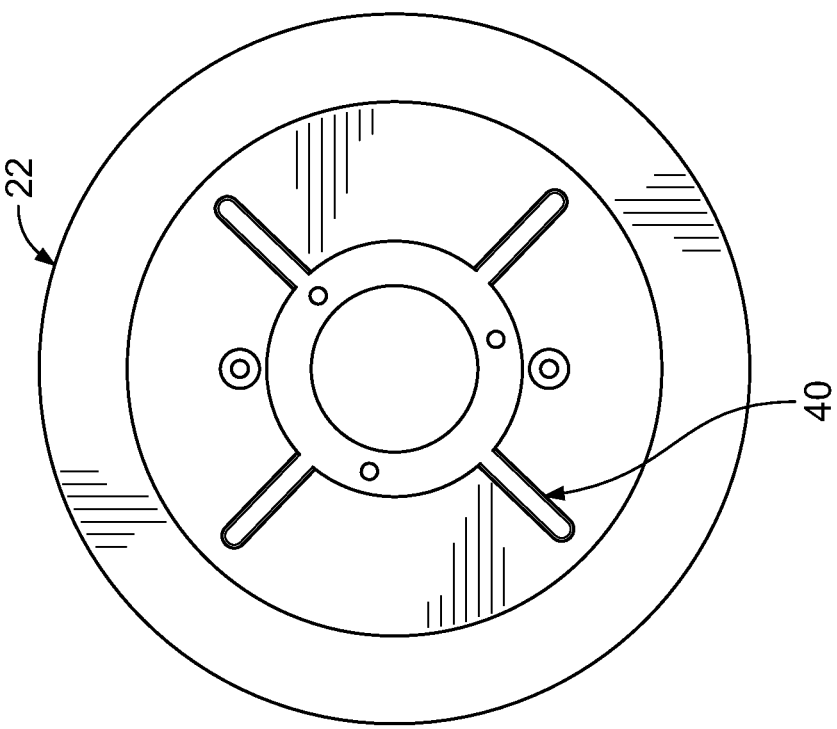
FIG. 6
FIG. 5
FIG. 4

CAMERA PLATFORM HORIZONTAL AXIS SHOCK AND VIBRATION ISOLATOR

BACKGROUND

The invention provides to an isolator for isolating a camera from shock and/or vibration. When filming or recording images, it is often necessary for the camera to be moved over a floor or ground surface. This movement must be accomplished smoothly. Even small amounts of shock or vibration of the camera can result in images that are shaky, erratic or blurred. Consequently, it is necessary to provide a steady platform for the camera by isolating the camera from shock and vibration. It is an object of the invention to provide an improved shock and vibration isolator for use with a camera.

SUMMARY OF THE INVENTION

In a new isolator design, a top plate is attached to a bottom plate via a universal joint that allows the top plate to pivot about two mutually perpendicular axes relative to the bottom plate. A camera attachment fitting, such a Mitchell mount fitting, may be provided on the top plate, for attaching a camera or camera accessory to the top plate. A threaded fitting may be provided on the bottom plate, for attaching the isolator to a supporting structure, such as the arm of a camera crane or camera dolly, or to an intermediate accessory such as a riser, drop-down, extension, etc. A dampener/spring element is positioned between the top and bottom plates. The dampener/spring element may be separate springs and dampeners, such as gas or viscous dampeners. Alternatively, spring loaded shock absorbers, or a resilient material may be used. The isolator may effectively isolate the camera from shock and vibration.

BRIEF DESCRIPTION OF THE DRAWINGS

FIG. 4 is a top view of the top plate shown in FIGS. 2 and 3.

FIG. 5 is a side view of the top plate shown in FIG. 4.

FIG. 6 is a bottom view of the top plate shown in FIGS. 4 and 5.

DETAILED DESCRIPTION OF THE DRAWINGS

Figure 1:
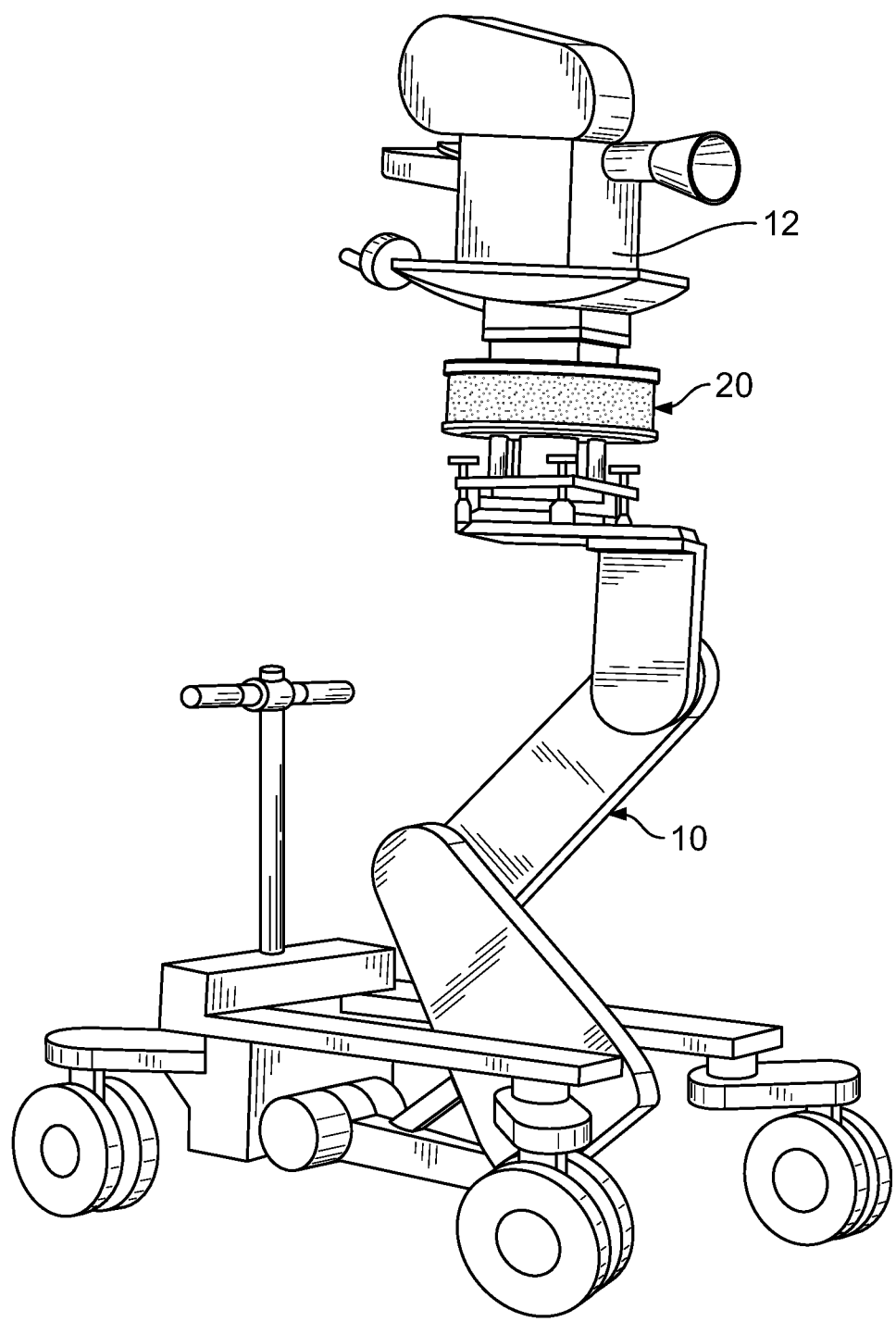
FIG. 1 is a perspective view of a shock and vibration isolator attached to the arm of a camera dolly and supporting a camera.
Figure 2:
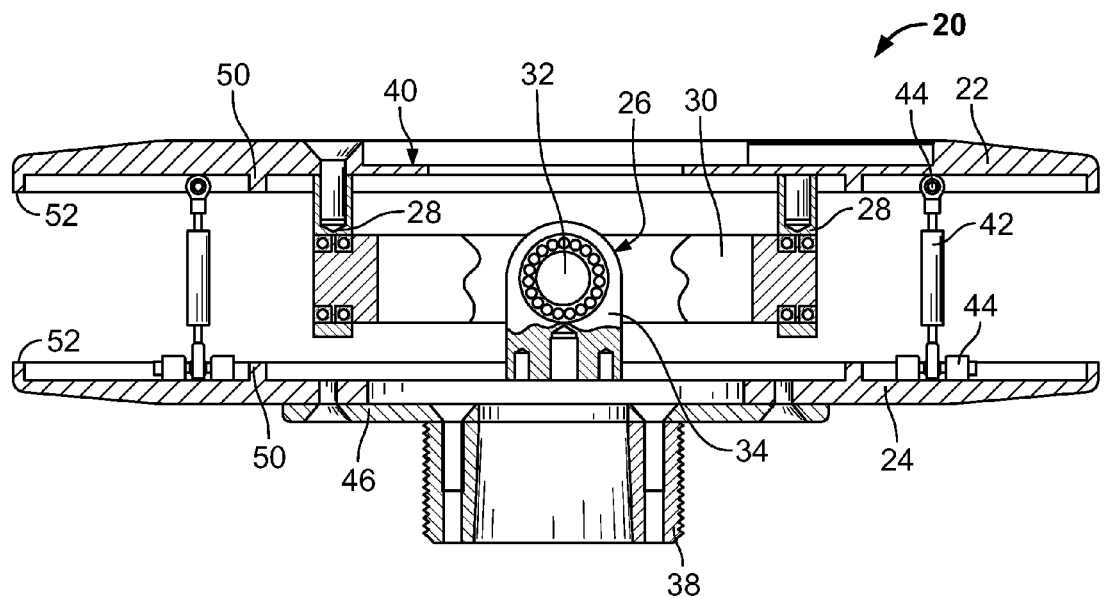
FIG. 2 is section view of another isolator.

A shown in FIG. 1, an isolator 20 may be supported on a camera dolly 10 or a camera crane, to isolate a camera 12 from shock and vibration. FIG. 2 shows a first embodiment having a top plate 22 attached to a bottom plate 24 via a universal joint 26. The isolator may be attached to a camera dolly 10 or camera crane arm using a hollow threaded stud 38 attached to a stud plate 46 on the bottom plate 24.

Figure 3:
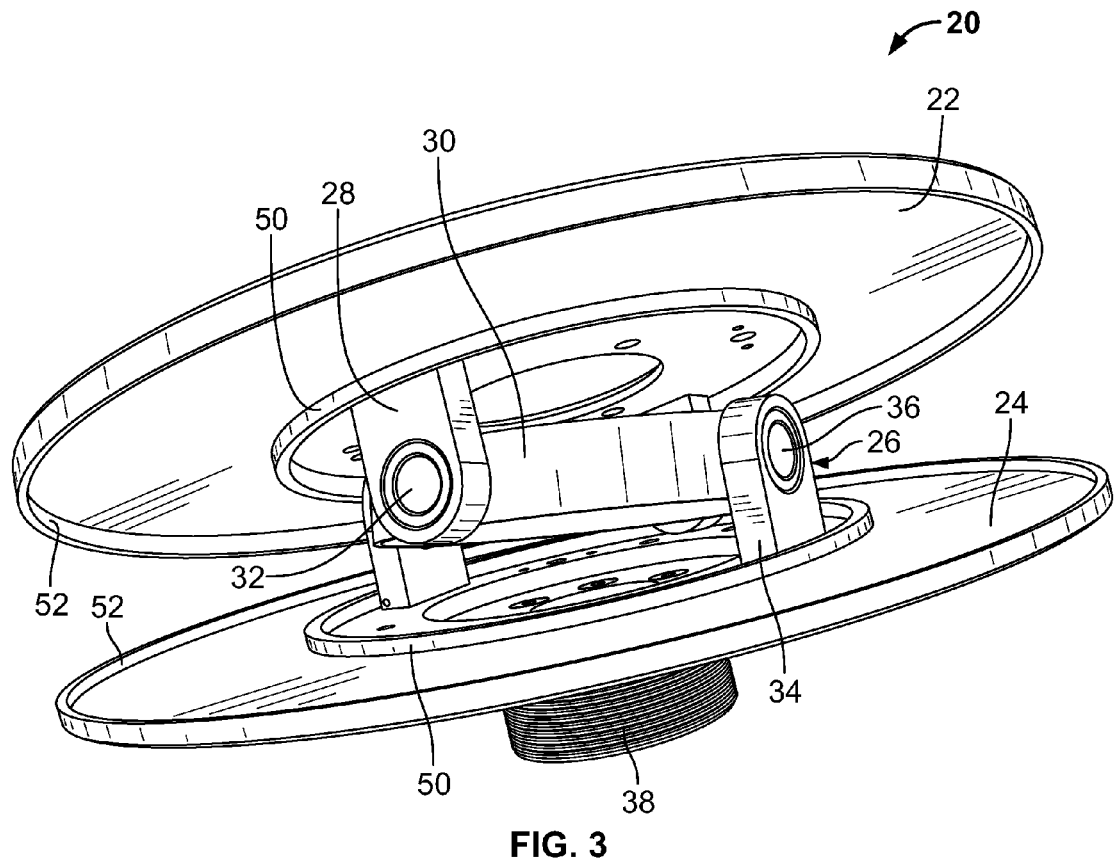
FIG. 3 is a perspective view of the top and bottom plates and the universal joint of the isolators shown in FIGS. 1 and 2.

FIG. 3 shows an example of a universal joint 26 having upper arms 28, or lateral arms, extending down from a bottom surface of the top plate, and lower arms 34, or longitudinal arms 34 extending up from a top surface of the bottom plate. An axle ring 30 has lateral and longitudinal axles 32 and 36 that are pivotally attached to the lateral and longitudinal arms, respectively. The arms may attach to the axles through bearings. Other types of universal joints may also be used.

The universal joint 26 allows the top plate 22 to pivot about lateral and longitudinal axes relative to the bottom plate 24. The limit of pivoting movement may vary depending on several factors. In the design shown, pivoting movement may be limited to about +/−15 or 12 degrees.

As shown in FIG. 2, dampener/spring elements 42 are pivotally attached to the top and bottom plates via pivot attachments 44. The dampener/spring elements 42 may be spring loaded shock absorbers. If used, the spring loaded shock absorbers exert an outward, compressive force acting on the plates tending to hold or return the top plate to the level position shown in FIG. 2, where the top plate is parallel to the bottom plate. The spring loaded shock absorbers may also have gas or liquid viscous dampening, to dampen movement of the top plate relative to the bottom plate. Other forms of dampener/spring elements may also be used. For example, separate spring elements, and separate dampening elements may be used. In the example shown in FIG. 2, four equally spaced apart spring loaded shock absorbers are used.

Figure 7:
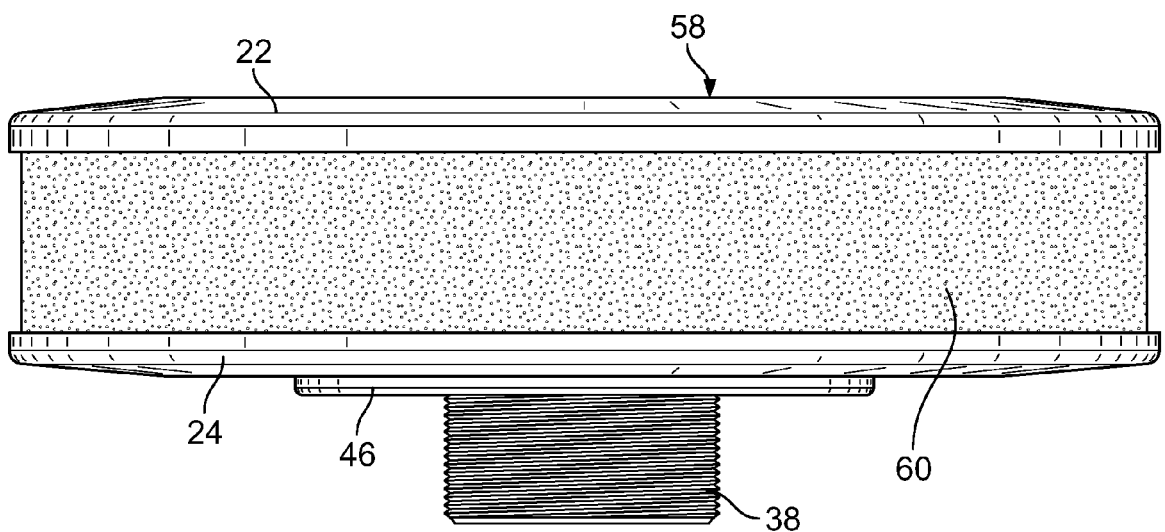
FIG. 7 is a side view of the isolator shown in FIG. 1.

As shown in FIGS. 2 and 3, the top and bottom plates may have inner rims 50 and outer rims 52. As shown in FIGS. 1 and 7, the dampener/spring element 42 may optionally be provided as one or more pieces of a resilient material, such as open cell foam, or foam rubber. In this case, the resilient material can also be in the form of a ring 60 which is held between the plates via the inner and outer rims 50 and 52, as shown in FIG. 7. With the ring 60 captive between the plates, the ring need not be adhered to either plate, allowing for easier manufacture of the isolator, and replacement of the ring. In the embodiment shown in FIG. 2, the rims may be omitted.

Turning to FIGS. 4-6, a fitting or feature may be provided on the top plate, to allow a camera or a camera accessory to be conveniently attached to the top plate. The fitting 40 may be a Mitchell mount, which is a standard fitting well known in the motion picture industry. Other types of fittings may of course optionally be used.

FIGS. 2 and 7 show scale drawings of the isolator 20 with all elements shown in proper proportion. Setting aside the Mitchell mount 42 and hole patterns, the top and bottom plates may optionally be the same. As shown in FIG. 7, the top and/or bottom plate may have a flat central area and an angles or tapering outer annular section, leading out to an outer rim 52, if used. The rim 52 on one or both plates may be used to help hold ring 60 or resilient material in place.

If used, the ring 60, or other shapes of resilient materials, may be pre-loaded by compressing it between the plates. Pre-loading the resilient material insures that it will provide adequate force to quickly return the load to a level position. The resilient material may be a combination of materials such as urethane foam, foam rubber, others. These types of resilient materials have both spring and dampening characteristics. Consequently, when the top plate 22 is displaced from level due a shock or vibration impulse, the resilient material acts to quickly return it to level, via the materials spring characteristic, with little or no overshooting or resonance, via the materials dampening characteristics.

When the resilient material is compressed between the plates to provide pre-loading, it may tend to radially bulge out at the sides. Optionally, and elastic retainer or strap may encircle the resilient material, to provide a higher material spring constant. Different types and shapes of resilient material may be used for handling different loads. A resilient material between the plates may also be used in combination with the dampener/spring elements 42 shown in FIG. 2.

Thus, a novel isolator has been shown and described. Various changes and substitutions may of course be made, without departing from the spirit and scope of the invention. The invention, therefore, should not be limited, except by the following claims, and their equivalents.

What is claimed is:

1. An isolator, comprising:
   a top plate attached to a bottom plate via a universal joint that allows the top plate to pivot about two mutually perpendicular axes relative to the bottom plate;
   a camera attachment fitting on the top plate;
   a threaded fitting on the bottom plate, for attaching the isolator to a supporting structure;
   at least two dampeners spaced apart from each other and attached to the top and bottom plates via pivot elements; and
   at least two compression springs spaced apart from each other and attached to the top and bottom plates, with the springs urging the plate away from each other and acting to hold the top plate parallel to the bottom plate when no shock or vibration is applied to the isolator.

2. The isolator of claim 1 wherein the dampeners and springs are combined into four equally spaced apart dampener/spring elements.

3. The isolator of claim 2 wherein the top and bottom plates are round plates.

4. The isolator of claim 3 with the top plate having a flat central area and an angled annular section between the flat central area and an outer rim.

5. The isolator of claim 2 with the dampener/spring elements perpendicular to the top and bottom plates when no shock or vibration is applied to the isolator.

6. The isolator of claim 1 with the universal joint including an axle ring having a pair of lateral axles aligned perpendicularly to a pair of longitudinal axles, and with the lateral axles pivotally attached to a pair of lateral arms on the top plate, and with the longitudinal axles pivotally attached to a pair of longitudinal arms on the bottom plate.

7. An isolator, comprising:
   around top plate and a round bottom plate;
   a pair of spaced apart lateral axis arms attached to a bottom surface of the top plate;
   a pair of spaced apart longitudinal axis arms attached to a top surface of the bottom plate;
   an axle ring having lateral axles pivotally attached to the lateral axis arms, and longitudinal axles pivotally attached to the longitudinal axis arms, to allow the top plate to pivot about lateral and longitudinal axes relative to the bottom plate;
   four equally spaced apart dampener/spring elements attached to the top and bottom plates via pivot attachments, with each dampener/spring element including a compression spring acting to push the plates away from each other, and with the dampener/spring elements perpendicular to the top and bottom plates and acting to hold the top plate parallel to the bottom plate when no shock or vibration is applied to the isolator;
   a camera attachment fitting on the top plate; and
   an isolator attachment fitting on the bottom plate.

8. The isolator of claim 7 with the top and bottom plates each having a flat central area and an angled annular section between the flat central area and an outer rim.

* * * * *